UNITED STATES PATENT OFFICE 2,562,011

HERBICIDAL COMPOSITIONS AND APPLICATION THEREOF

Luther L. Baumgartner, Hastings on Hudson, N. Y., assignor to The B. F. Goodrich Company, New York, N. Y., a corporation of New York No Drawing. Application December 10, 1948, Serial No. 64,709

10 Claims. (Cl. 71—2.7)

This invention relates to herbicidal compositions and their application, and more specifically pertains to herbicidal compositions containing an alkali metal isopropyl or allyl xanthate as the toxic ingredient and to the use of such compositions for the chemical weeding of growing crops, for pre-emergence treatment to eliminate weeds in planting areas, for defoliating growing plants, and in numerous other herbicidal applications.

Many chemical compounds have been tested as herbicides but in general those which are most effective in killing plant life of widely diverse varieties, are quite costly, or are difficult and expensive to formulate, or possess one or more other undesirable features such as toxicity to man or higher animals, irritability to the human skin, instability in storage or corrosiveness to conventional application equipment, all of whch have tended to prevent their widespread use. Consequently, there has long existed an unsatisfied need for a general purpose herbicide which is efficient, economical and safely and effectively stored, handled and applied under diverse conditions.

In endeavoring to supply this need, I have investigated the herbicidal activity of certain alkali metal alkyl xanthates in the hope that these chemicals, which are relatively inexpensive and are water-soluble and hence easily formulated and applied in water solution and which in addition are free from the undesirable features mentioned above, would possess general and effective herbicidal activity. These investigations have revealed that simple aqueous solutions of alkali metal isopropyl and allyl xanthates in low concentrations such as 0.1 to 15% by weight, possess herbicidal activity against certain young succulent weed plants without producing undesirable soil contamination but, unfortunately, such solutions do not possess sufficient and varied activity to be generally useful in herbicidal applications.

Quite surprisingly, however, I have discovered that compositions containing such a xanthate in the same concentration and also containing a wetting agent in an amount of about 0.01% to 1% by weight, are exceedingly efficient herbicides, being effective in killing practically all pestiferous weed plants, whether in the young and succulent form or near or at maturity, in defoliating crop plants such as potatoes and cotton, in killing vines of various kinds, in pre-emergence weeding and in various other herbicidal applications. Consequently, such compositions go far towards satisfying the need for an economical and effective general purpose herbicide.

These herbicidal compositions containing an alkali metal isopropyl or allyl xanthate together with a wetting agent will also, of course, contain an inert fluent carrier or diluent medium which may be water, so as to provide a spraying composition, or an inert powdered solid material such as clay, talc, chalk, fuller's earth, kieselguhr, diatomaceous earth, "Pyrax" (ground aluminum silicate), or the like, so as to provide a dusting composition. Moreover, compositions for use in concentrate spray formulations adapted to be applied in atomized form may contain, in addition to water, xanthate and wetting agent, a hydrocarbon oil containing predominantly paraffin hydrocarbons of 10 to 20 carbon atoms such as kerosene and other petroleum fractions employed as fuel oils, in order to aid in atomization. However, the compositions should preferably be free of other ingredients whose presence is unnecessary in providing a suitable spraying or dusting composition since in many cases the herbicidal activity may be adversely affected thereby.

Any alkali metal isopropyl or allyl xanthate can be used to prepare the compositions of this invention. Among these xanthates are, for example, sodium allyl xanthate, potassium allyl xanthate, lithium allyl xanthate, sodium isopropyl xanthate, potassium isopropyl xanthate and lithium isopropyl xanthate. All these xanthates have the chemical formula

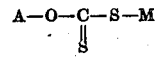

wherein A is an allyl or isopropyl radical and M is an alkali metal.

As mentioned hereinabove, the concentration of the xanthate in the compositions of this invention may vary from as little as 0.1% by weight to as much as 15% by weight depending on the specific formulation and application. Compositions containing relatively low xanthate concentrations such as in the range of 0.1 to 1% by weight have been found to possess selective herbicidal activity in that they effectively kill certain weeds such as mustard, thistle, portulaca but do not appreciably damage grasses or berry plants; or woody tissued plants, hence, such compositions are useful in weeding cereal crops, berry patches, especially strawberries, lawns, etc. At higher xanthate concentrations in the range of about 1 to 5% or more up to even 15%, however, the compositions may be used to kill all plant growth with which it comes in contact with the exception of trees and other perennial woody tissued plants. Such compositions are used to defoliate plants, to kill weeds in cultivated crops (by applying the composition between the rows) and to rid areas of all plant growth therein.

The wetting agents which can be used with the alkali metal allyl and isopropyl xanthates to prepare the herbicidal compositions of this invention are those typified by the following general classifications: sodium and potassium salts of fatty acids known as soft and hard soaps; fatty acids saponified with amines and amino alcohols; water-soluble salts of disproportionated abietic acid known as rosin soaps; water-soluble salts of the hydroxy aldehyde acids present in seaweeds known as algin soaps; water-soluble alkali-casein compositions; water-soluble lignin sulfonate salts; water-soluble long chain alcohols usually containing 10 to 18 carbon atoms; water-soluble salts of sulfated fatty alcohols containing 10 to 18 carbon atoms; water-soluble salts of fatty acid amides; water-soluble salts of sulfated esters of fatty acids; water-soluble alkyl sulfonates having about 8 to 20 carbon atoms in the alkyl group; water-soluble aryl sulfonates; water-soluble alkyl aryl sulfonates; water-soluble aralkyl sulfonates; water-soluble sorbitan monolaurates, -palmitates, -stearates, and -oleates; quaternary alkyl halides; and others. These wetting agents are sold under numerous trade names and may be either pure compounds or mixtures of compounds of the same general group.

In general, the wetting agents are employed in concentrations of from about 0.01% by weight to about 1.0% by weight based on the total weight of the herbicidal composition prepared. In the specific examples which hereinafter appear, the use of wetting agents is more specifically described.

In applying the herbicidal compositions of this invention to agricultural areas it has been found that application at a rate so as to provide about 10 to 50 lbs. of xanthate per acre is sufficient to produce the desired effect. However, more vigorous applications up to about 100 lbs. of xanthate per acre may be made if desired without any adverse effect on the soil or its ability to be used for growing plants in the normal manner. These rates of application are also effective when simple water solutions of the xanthates are used to kill young succulent weed plants or seedling weed plants as in pre-emergence weeding.

The following specific examples taken from actual field trials illustrate the effectiveness and versatility of the compositions of this invention, and also provide comparisons of efficiency of compositions with and without a wetting agent.

Example I 55.5 parts by weight of sodium isopropyl xanthate were dissolved in 100 parts by weight of water containing 0.125 part by weight of mixed sodium alkyl sulfates whose alkyl groups have 8 to 16 carbon atoms with the average of carbon atoms in the mixture being 12.

This solution was used to wet 228 parts by weight of pyrax, which is finely ground aluminum silicate. The resulting mixture was mixed well and dried. The resulting dry mixture was diluted with 272 parts by weight of dry finely ground aluminum silicate and thoroughly mixed in a ball mill. The resulting dust containing 10% sodium isopropyl xanthate, and about 0.02% wetting agent, was applied between rows of radishes to mixed weeds among which were pigweed, lamb's quarters, galinsoga and portulaca at a rate of about 10 lbs. of xanthate per acre. Observations made five days after this treatment revealed a 100% kill of all the above enumerated weeds.

Example II 55.5 parts by weight of potassium allyl xanthate were dissolved in 100 parts by weight of water containing 0.125 part by weight of mixed sodium alkyl sulfates whose alkyl group have 8 to 16 carbon atoms with the average alkyl group having 12 carbon atoms. This solution was used to wet 228 parts of finely ground aluminum silicate. The resulting mixture after being thoroughly mixed and dried was diluted with 272 parts of dry finely ground aluminum silicate. This dust was applied to pigweed, lamb's quarters, galinsoga, and portulaca growing between rows of radishes as in Example I. Observations made five days after this treatment revealed a 100% kill of all of the above-enumerated weeds.

Example III

A dust prepared by wetting 228 parts of finely ground aluminum silicate with an aqueous solution containing 55.5 parts of sodium isopropyl xanthate, drying the mixture and diluting with 272 parts of dry finely ground aluminum silicate, and a dust prepared by wetting 228 parts of finely ground aluminum silicate with an aqueous solution containing 55.5 parts of potassium allyl xanthate, drying the mixture and diluting this mixture with 272 parts of dry finely ground aluminum silicate were applied at the rate of Example I to a variety of vigorously growing weeds including pokeweed, daisy fleabane, thistle, hollyhock, bluegrass, crabgrass, milkweed, aster, portulaca, galinsoga, smartweed, and pigweed growing between rows of beets. Observations were made daily after the third day from this treatment, but even after twenty days there was only moderate injury to pokeweed and portulaca while there was neither plant injury nor marginal leaf injury to the other weed plants.

Example IV

Aqueous solutions containing 0.5%, 1.0% and 1.5% by weight of sodium isopropyl xanthate and solutions containing 0.5%, 1.0% and 1.5% of potassium allyl xanthate were sprayed on the green foliage of substantially mature potato plants. Each solution was applied to a separate row and each concentration was applied but once. Each plant was sprayed until the solution ran off the leaves. Five days after treatment there was no more than spotty marginal leaf injury.

Example V

Aqueous solutions containing sodium isopropyl xanthate and sodium lauryl sulfate at concentrations of 0.5%, 1.0% and 1.5% by weight of the xanthate and each solution contained 0.125% by weight of the sulfate were applied to green foliage of substantially mature potato plants and also to a variety of weeds between and around the vines. Each solution was applied to a separate plot and each solution was applied but once. The spray compositions were applied to the plants until the aqueous compositions ran off the leaves. Five days after treatment the following observations were made. In the plot sprayed with the aqueous composition containing 0.5% by weight of sodium isopropyl xanthate and 0.125% by weight of sodium lauryl sulfate, all potato vines and about 50% of all weeds among the vines were dead. In the row sprayed with the aqueous composition containing 1.0% by weight of sodium isopropyl xanthate and 0.125% by weight of sodium lauryl sulfate, all potato vines and all weeds except some crabgrass were dead. In the row sprayed with the aqueous composition containing 1.5% by weight of sodium isopropyl xanthate and 0.125% by weight of sodium lauryl sulfate, all potato vines and weeds were dead and all the crabgrass present was severely injured.

Example VI

Aqueous spray compositions containing potassium allyl xanthate as the active ingredient and sodium lauryl sulfate as a wetting agent were sprayed on potato vines. The treatment routine was the same as that employed in the tests described in Example V. Five days after treatment the following observations were made. In the row sprayed with an aqueous spray composition containing 0.5% by weight of potassium allyl xanthate and 0.125% by weight of sodium lauryl sulfate, all potato vines were dead and about 50% of all weeds except crabgrass were dead. In the row sprayed with the aqueous composition conraining 1.0% by weight of potassium allyl xantaining and 0.125% by weight of sodium lauryl sulfate, all the potato vines and all weeds present except crabgrass were dead. In the row sprayed with the aqueous composition containing 1.5% potassium allyl xanthate and 0.125% sodium lauryl sulfate, all the potato vines and all the weeds were dead and any crabgrass present was so severely injured that in a few days later even this weed was dead.

Example VII

Formulations of sodium isopropyl xanthate, sodium lauryl sulfate and pyrax, and formulations of potassium allyl xanthate, sodium lauryl sulfate and finely ground aluminum silicate were prepared as described in Example I, and dusted between rows of potatoes to inhibit growth of such weeds as portulaca, chickweed, lamb's quarters, galinsoga, Spanish needles and pokeweed. The applications of these dusts were made when the potato vines were five to six inches high. Each test plot was sprayed with a single application of one dust formulation. The dust containing 5% by weight of sodium isopropyl xanthate and 0.125% by weight of sodium lauryl sulfate and the dust containing 5% by weight of potassium allyl xanthate and 0.125% by weight of sodium lauryl sulfate were both applied at a rate to provide 45.5 pounds of xanthate per acre. Both of these dust compositions gave complete weed control until harvest of the potatoes.

Example VIII

Four study test plots consisting of 112 foot rows of strawberries badly infested with weeds of a wide variety were sprayed with aqueous solutions containing sodium isopropyl xanthate and with aqueous solutions of potassium allyl xanthate to determine the effectiveness of these spray compositions with and without a wetting agent. Test plot A was sprayed with an aqueous solution containing 1.5% by weight of sodium isopropyl xanthate, Test plot B was sprayed with an aqueous solution containing 1.5% potassium allyl xanthate, Test plot C was sprayed with an aqueous solution containing 0.5% by weight of sodium isopropyl xanthate and 0.5% by weight of the wetting agent Isonol DL–1, dilauryl-dimethyl ammonium bromide, and Test plot D was sprayed with an aqueous solution containing 0.5% by weight of potassium allyl xanthate and 0.5% by weight of Isonol DL–1. During a period of 53 days only the most succulent emerging plants were killed in plots A and B while in plots C and D all weeds except the perennial grasses were killed.

The above examples clearly demonstrate the exceptional herbicidal activity of the compositions of this invention against a wide variety of plants. Also, the above examples illustrate the criticality of the presence of a wetting agent in the herbicidal compositions.

Water-soluble herbicides such as those employed as the toxicants in the compositions of this invention are extremely useful and desirable in most instances, for they facilitate quick formulations and result in a reduction in spray costs. Also, the dust formulations which are prepared as hereinbefore described in the specific examples take advantage of the water-solubility of the toxicants to facilitate more rapid formulation at a lower cost. But the aqueous spray compositions and the dust compositions are employed mainly with equipment that applies compositions containing a relatively low concentration of the toxicants. Since the recent development of spraying equipment which employs a formulation containing a high concentration of the toxicant and atomizes the high toxicant concentration composition with air and in that manner employs air as a diluent carrier, a different type of formulation of the xanthate and wetting agent composition of this invention is required for these new concentrate sprayers.

Example IX

The following specific formulations were applied at such a rate as to provide about 20 pounds per acre of the xanthate to plots containing mostly galinsoga, pigweed and lamb's quarters weed plants. In each plot treated all of the named weed plants were killed.

Sodium isopropyl xanthate 2 parts by weight were dissolved in 100 parts by weight of water containing 1 part by weight of sodium lauryl sulfate. To this aqueous solution there was added 5 parts by weight of kerosene with vigorous agitation of the mixture to form a stable emulsion.

Example X

Sodium isopropyl xanthate 2 parts by weight and 0.8 part by weight of a wetting agent sold as Triton NE (which is a yellow liquid aryl-alkyl polyether alcohol) were dissolved in 100 parts by weight of water. To this aqueous solution there was added 15 parts by weight of kerosene with vigorous agitation of the mixture to produce a stable emulsion.

Other oils preferably the light hydrocarbon oil fractions having 10 to 20 carbon atoms may be employed in preparing the concentrate spray formulations. More specifically such light oil fractions as those employed as fuel oils can be employed in place of the kerosene used in the above specific formulations. In general, it is sufficient to employ from 1% by weight to about 15% by weight of the oil based on the total weight of the spray composition, to form suitable concentrate spray compositions.

The herbicidal compositions either as aqueous spray compositions or as dust compositions can be successfully employed as pre-emergent herbicides, that is, the composition can be applied to the soil after the fitting and planting of the seed bed to kill the young tender seedling weed plants as they emerge from the soil. For this purpose, it is not necessary to employ a wetting agent but one may be employed if desired. The following specific examples are illustrative of the treatment of the soil for such pre-emergent weed killing.

Example XI

A portion of a seed bed newly fitted and planted to peas was sprayed with a composition containing 400 parts by weight of water and 15 parts by weight of sodium isopropyl xanthate at the rate of .15 pounds per acre. After 41 days it was observed that the seeds of peas had germinated and had emerged from the soil. The treated plots averaged 43.6 gms. of weeds per square foot but an untreated plot contained 162.2 gms. of weeds per square foot.

Example XII

A portion of a seed bed newly fitted and planted to peas was dusted with a composition containing 15 parts by weight of sodium isopropyl xanthate and 60 parts by weight of finely ground aluminum silicate. After 41 days it was observed that the seedlings of peas had emerged and were not injured by this treatment. The treated plots averaged 31.6 gms. but an untreated plot contained 164.2 gms. of weeds. The peas grew normally and showed no signs of injury.

The following example further illustrates the versatility and utility of the compositions of this invention.

Example XIII

Spray and dust compositions containing sodium isopropyl xanthate or potassium allyl xanthate as the toxicant were sprayed on the weed and other plant growth in an apple orchard. No care was taken to protect the trees from the herbicidal compositions and in fact heavy spray or dust deposits on the trunks of the trees resulted from this treatment. There was no apparent injury to the trees during the growing season which followed or during the growing season of the next year. Thus, these herbicidal compositions can be used in plots of desirable growths of woody plants without injury to the desirable woody plants.

The above examples of specific uses of the herbicidal compositions of this invention will suggest many additional herbicidal uses. In addition to the above specific uses the dust and aqueous spray compositions of this invention can be employed to eradicate weed growth in plots of cotton, corn, tobacco and other field crops as well as Lima beans, peas, onions, cabbage, lettuce and other truck garden crops.

Although I have disclosed specific examples of my herbicidal compositions and specific uses of these compositions, I do not thereby desire or intend to limit myself solely thereto, for as hereinbefore stated other formulations and concentrations can be employed when desired without departing from the spirit and scope of this invention as defined in the appended claims.

I claim:

1. A herbicidal composition comprising from 0.1% to 15% by weight of a compound having the formula:

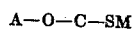

where M is an alkali metal and A is a hydrocarbon radical selected from the group consisting of allyl and isopropyl, as the essential active ingredient, and from 0.01% to 1.0% by weight of a dispersing and emulsifying agent.

2. A herbicidal composition consisting of from 0.1% to 15% by weight of sodium isopropyl xanthate as the essential active ingredient and 0.01% to 1.0% by weight of a dispersing and emulsifying agent.

3. A herbicidal composition consisting of from 0.1% to 15% by weight of sodium isopropyl xanthate as the essential active ingredient, 0.01% to 1.0% by weight of a dispersing and emulsifying agent and the remainder being water.

4. A herbicidal composition consisting of from 0.01% to 15% by weight of sodium isopropyl xanthate as the essential active ingredient, 0.01% to 1.0% by weight of a dispersing and emulsifying agent, and the remainder being a powdered inert solid.

5. A selective herbicidal composition consisting of from 0.1% to 1.0% by weight of sodium isopropyl xanthate, 0.01% to 1.0% by weight of a dispersing and emulsifying agent and the remainder being water.

6. A selective herbicidal composition consisting of from 0.1% to 1.0% by weight of sodium allyl xanthate, 0.01% to 1.0% by weight of a dispersing and emulsifying agent and the remainder being water.

7. A method of killing plant life in agricultural plots which comprises applying to the plot a lethal amount of a herbicidal composition comprising from 0.1% to 15% by weight of a compound having the formula:

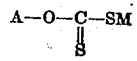

where M is an alkali metal and A is a hydrocarbon radical selected from the group consisting of allyl and isopropyl and from 0.01% to 1.0% by weight of a dispersing and emulsifying agent.

8. A method of selectively killing weeds in an agricultural plot which comprises applying to the plot a lethal amount of a composition comprising from 0.1% to 1.0% by weight of sodium isopropyl xanthate and 0.01% to 1.0% by weight of a dispersing and emulsifying agent.

9. A method of defoliating plants which comprises applying to the plants a lethal amount of a composition comprising from 1.0% to 15% by weight of alkali metal isopropyl xanthates and 0.01% to 1.0% by weight of a dispersing and emulsifying agent.

10. A method of treating soil for the pre-emergent killing of weeds which comprises treating the soil with a lethal amount of a composition comprising 1.0% to 15% by weight of sodium isopropyl zanthate and 0.1% to 1.0% by weight of a dispersing and emulsifying agent.

LUTHER L. BAUMGARTNER.

REFERENCES CITED

The following references are of record in the file of this patent:

UNITED STATES PATENTS

| Number | Name | Date |
|---|---|---|
| 2,174,372 | Zahn | Sept. 26, 1939 |
| 2,390,941 | Jones | Dec. 11, 1945 |
| 2,392,859 | Meuli | Jan. 15, 1946 |

OTHER REFERENCES

Proc. Amer. Soc. Horticultural Science—Vol. 35 (April 1938), pages 438 to 442.

Science, Oct. 16, 1936, page 356.